Dec. 16, 1952     E. SCHEUER     2,622,019
DISTILLATION OF ALUMINUM FROM ALUMINUM BEARING MATERIAL
Filed Aug. 12, 1949
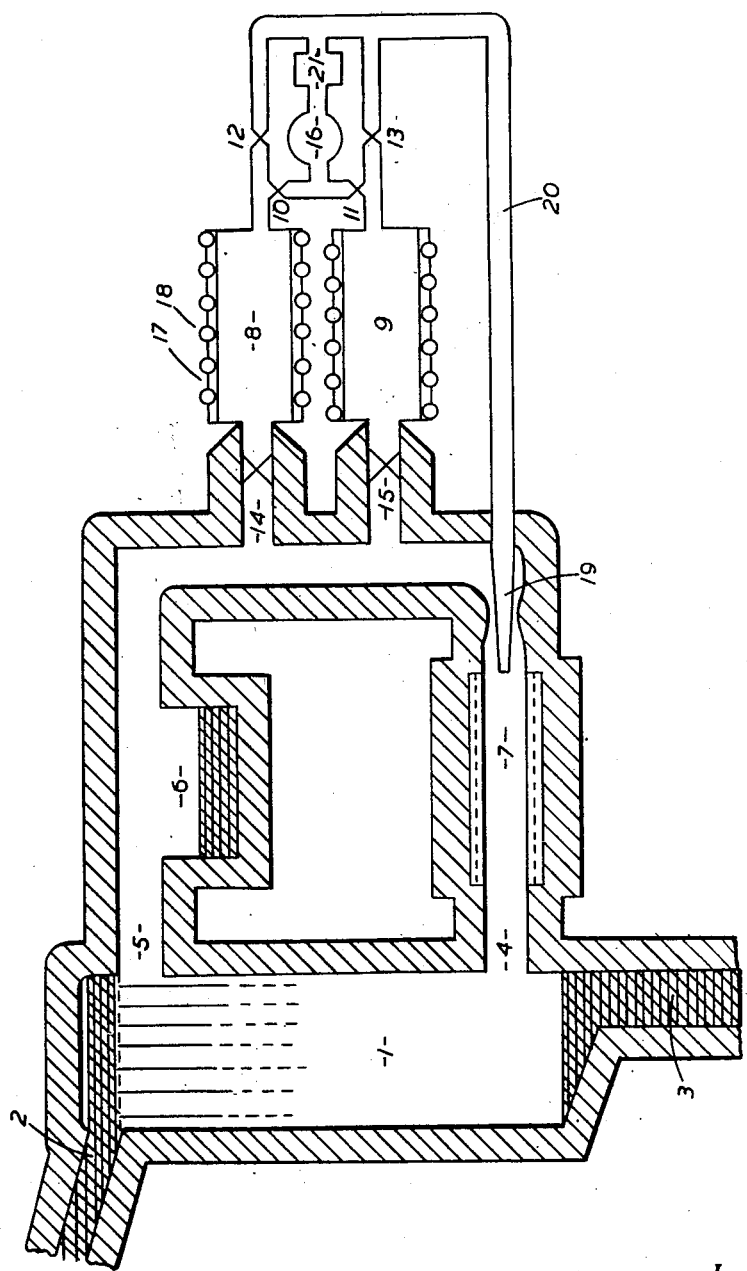
Inventor
ERNST SCHEUER Patented Dec. 16, 1952

2,622,019

UNITED STATES PATENT OFFICE 2,622,019

DISTILLATION OF ALUMINUM FROM ALUMINUM BEARING MATERIAL

Ernst Scheuer, Stone, England, assignor, by mesne assignments, to Aluminium Laboratories Limited, Montreal, Quebec, Canada, a corporation of Canada Application August 12, 1949, Serial No. 110,002
In Great Britain August 18, 1948

2 Claims. (Cl. 75—68)

British Patent specification 582,579 discloses a method of extracting pure aluminium from aluminium bearing material (alloys or ores) in which the vapour of halides, especially $AlCl_3$, is brought into contact with the said material at elevated temperature and reduced pressure, and aluminium is then deposited in pure form from the resulting vapour, preferably in the molten state, by cooling the said vapour in a condenser to temperatures of the order of 700° C. The quantity of halide passing through the system is considerably larger than the amount of aluminium obtained (for instance with $AlCl_3$ 2.5–7 times the weight of the aluminium) according to the working conditions, but this halide can be re-used.

One way to re-use the halide is to condense it (after the aluminium has been deposited) remove it from the system and later introduce it as vapour at the other end by heating the condensate to a suitable temperature. For this purpose it has been suggested to provide two or more chambers which can be connected in different ways so as to function alternately as halide condenser and as vapour generator, thus transferring the halide to and fro between these two chambers but passing it through the reaction chamber and aluminium condenser always in the same direction.

This procedure ensures complete re-utilisation of the halide but still requires cooling the whole large quantity of halide to condensation followed by evaporation and heating up to 700° C. again every time it passes through the system.

In order to avoid this loss of heat it has been proposed to re-circulate the halide vapour in the system by a suitable pumping arrangement without condensing it.

The present invention provides an advantageously novel recirculation pumping arrangement for this purpose.

The pump has to deal with a gas at low pressure and at high temperature (about 700° C.); it has to work in a hermetically closed apparatus and, if condensation of the halide vapour is to be avoided, no part of the apparatus must operate below the condensation temperature of the halides; moreover, the gas is also chemically rather active.

By way of example one embodiment of the invention is shown on the accompanying schematic drawing which represents a section through the plant.

On the drawing 1 is the reaction chamber through which impure aluminium enters at the top from the conduit 2 and, after evaporation of part or all of its aluminium content, leaves at 3. The halide vapours enter at 4 and, having picked up aluminium, leave at 5, depositing pure aluminium preferably in liquid form, in the aluminium condenser 6, after which the halide vapours return to the reaction chamber 1 through the heater 7 and the duct 4.

When utilising the present invention the vacuum pump 16 which is needed to take care of any leakages in the seal of the apparatus (and may be required for the purpose of maintaining recirculation of the halide vapour in a manner to be described later) must be protected against damage from halide vapour by arranging suitably cooled condenser means between the circulation duct for the halide and the said vacuum pump. In case $AlCl_3$ is used the temperature of the condenser means will have to be far below 180° C., at which temperature the vapour pressure of $AlCl_3$ is equal to 1 atm., in order to prevent halide from getting into and depositing in the vacuum pump.

As the amount of $AlCl_3$ retained in the condenser means will have to be re-introduced into the system, two $AlCl_3$ condensers 8 and 9 are provided. Valves are arranged at 10, 11, 12, 13 for enabling either condenser to be connected singly with the vacuum pump 16 and at 14, 15 for connection with or cutting off from the main system. Further, either condenser can as required be heated or cooled. The heating elements are marked 17, the cooling elements 18.

In operating the described plant, one condenser is always cooled and connected with the vacuum pump whilst the other is heated and cut off from the vacuum pump. This last mentioned condenser is then acting as a generator of halide vapour and will replace the quantity retained in the cooled condenser protecting the vacuum pump. As soon as all halide is evaporated from the heated condenser, the connection with the vacuum pump and the heating and cooling are reversed, so that the empty condenser is now cooled and protects the vacuum pump whilst the one which contains a deposit of halide is heated to generate halide vapour which is recirculated into the system.

In accordance with the invention a gas injector 19 is provided for the purpose of circulating the halide vapour round the system. This injector may inject either an innocuous gas or it may inject some halide vapour ($AlCl_3$). Both being compatible with the reaction in the reaction chamber, will achieve the same result, given proper pressure. The amount of injected gas can be small compared with the amount of halide vapour to be recirculated. The amount depends mainly on the design of the injector and the pressure under which the gas is injected.

In order to maintain a constant pressure in the reaction chamber, gas will have to be extracted from the system at about the same rate as it is introduced by the injector and by leakage.

For this purpose two chambers 8, 9 are branched off the circulation ducting as described above. They are alternately switched in, one as condenser leading to the vacuum pump, the other one as generator of $AlCl_3$ vapour discharging its vapour at a pressure higher than that of the main stream of recirculating vapour into the injector, either unmixed or together with an innocuous gas. This vapour or mixture may be introduced from the vacuum pump itself by the pipe 20. If an innocuous gas, it may be supplied from a separate pressure container. The condenser is of course cooled and the generator heated.

When recirculating innocuous gas from the vacuum pump it may be passed through a cleaning system 21 to remove chemically active gases which may have entered the system through leakage.

A difficulty arises in connection with the valves effecting the switching of connection between the main circulating pipe, the condenser means or the vapour generator and the vacuum pump. The working of ordinary metal valves under the conditions of the process is often unreliable owing to chemical attack and condensation. In some cases it has been found advantageous to replace ordinary valves by constricted sections in the pipe which can be quickly and effectively heated above or cooled below the condensation point of $AlCl_3$ at the pressure prevailing in the system, and will accordingly be either blocked by a condensate or rendered free for passage of gas by evaporation of the condensate.

I claim:

1. In a process of distilling aluminium from aluminium-containing material by reaction of a vapour of a halide of the class consisting of fluoride, chloride and bromide with said material at subatmospheric pressure, the steps comprising recirculating said vapour at high temperature through a main system without intermediate condensation in said system, and causing said recirculation to be continuous by alternately connecting a vacuum pump to said main system through each of a plurality of condensers for condensing any of said halide vapour to inhibit entrance thereof into said pump, while closing another of said condensers except for an outlet to an injector through a conduit by-passing said pump, alternately re-evaporating said halide vapour in each of said condensers by application of heat thereto, and introducing said vapour under pressure into said main system in the direction of circulation therewithin by means of said injector.

2. In a process of distilling aluminium from aluminium-containing material by reaction of a vapour of a halide of the class consisting of fluoride, chloride and bromide with said material at subatmospheric pressure, the steps comprising recirculating said halide vapour at high temperature through a main system without intermediate condensation in said system, and causing said recirculation to be continuous by connecting a vacuum pump to said main system through a condenser for condensing any of said halide vapour to inhibit entrance thereof into said pump, closing said condenser except for an outlet to an injector through a conduit by-passing said pump, heating said condenser to re-evaporate said halide vapour, and introducing said vapour under pressure into said main system in the direction of circulation therewithin by means of said injector.

ERNST SCHEUER.

REFERENCES CITED

The following references are of record in the file of this patent:

UNITED STATES PATENTS

| Number | Name | Date |
| --- | --- | --- |
| 1,310,724 | Westburg | July 22, 1919 |
| 1,534,316 | Hoopes et al. | Apr. 21, 1925 |
| 1,636,881 | Tullis | July 26, 1927 |
| 1,922,429 | Frost | Aug. 15, 1933 |
| 2,090,451 | Kruh | Aug. 17, 1937 |
| 2,398,443 | Munday | Apr. 16, 1946 |
| 2,470,305 | Gross | May 17, 1949 |

OTHER REFERENCES

Chemical Engineers Handbook, 2nd edition, 1941, by Perry, page 1542, published by McGraw-Hill Book Co., Inc., New York.